United States Patent
Jung

(10) Patent No.: US 7,299,030 B2
(45) Date of Patent: Nov. 20, 2007

(54) SYSTEM AND METHOD OF CHARGING FOR USER TRAFFIC EXCEPT SIGNALING A WIRELESS COMMUNICATION SYSTEM

(75) Inventor: Tae-Sung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 11/075,723

(22) Filed: Mar. 10, 2005

(65) Prior Publication Data

US 2005/0227667 A1 Oct. 13, 2005

(30) Foreign Application Priority Data

Mar. 26, 2004 (KR) ............... 10-2004-0020806

(51) Int. Cl.
*H04M 11/00* (2006.01)
(52) U.S. Cl. ............... 455/406; 455/414.1; 370/238; 370/395.52
(58) Field of Classification Search ........... 370/328, 370/238, 277, 395.52; 455/406, 407, 408, 455/414.1
See application file for complete search history.

(56) References Cited

U.S. PATENT DOCUMENTS

| 5,784,442 | A | * | 7/1998 | Foti | 455/405 |
| 5,862,471 | A | * | 1/1999 | Tiedemann et al. | 455/406 |
| 6,195,543 | B1 | * | 2/2001 | Granberg | 455/407 |
| 6,567,657 | B1 | * | 5/2003 | Holly et al. | 455/408 |

\* cited by examiner

*Primary Examiner*—Temica Beamer
(74) *Attorney, Agent, or Firm*—Roylance, Abrams, Berdo & Goodman, L.L.P.

(57) ABSTRACT

A system and method of charging for user traffic without including signaling costs in a wireless communication system is provided. In a system and method of charging a user equipment (UE) in a gateway node in a mobile communication system having a serving support node within a radio network connected to the UE and the gateway node for connecting the radio network to a home server in an external network, the gateway node acquires from the external network the address of a home server that provides a service requested by the UE, stores the home server address, clears charging information collected with respect to signaling generated prior to the allocation of the home server address, and re-collects charging information about the service that the UE receives.

13 Claims, 6 Drawing Sheets

SYSTEM AND METHOD OF CHARGING FOR USER TRAFFIC EXCEPT SIGNALING A WIRELESS COMMUNICATION SYSTEM

PRIORITY

This application claims the benefit under 35 U.S.C. § 119(a) of an application entitled "Method of Charging for User Traffic Except Signaling in a Wireless Communication System" filed in the Korean Intellectual Property Office on Mar. 26, 2004 and assigned Serial No. 2004-20806, the entire contents of which are incorporated herein by reference.

BACKGROUND OF THE INVENTION

1. Field of the Invention

The present invention relates generally to user charging in a mobile communication system. In particular, the present invention relates to a system and method of improving the charging of users for signaling generated for providing services that they have enjoyed.

2. Description of the Related Art

FIG. 1 is a block diagram illustrating the configuration of a conventional Universal Mobile Telecommunication System (UMTS) system.

Referring to FIG. 1, the UMTS system comprises User Equipments (UEs) which want particular services, a radio access part, and a Core Network (CN) part. The radio access part includes Node Bs and a Radio Network Controller (RNC) 105, and the CN part includes a Serving GPRS Support Node (SGSN) 110 and a Gateway GPRS Support Node (GGSN) 120. A mobile user can retrieve data from a data server of an external network, Packet Data Network (PDN) 130 over the UMTS network.

The SGSN 110 and the GGSN 120 collect information about the amount of traffic created for a specific Packet Data Protocol (PDP) context as charging information. The charging information that they collect includes a call duration, uplink data amount, downlink data amount, and Quality of Service (QoS) information.

The GGSN 120 provides services according to an Access Point Name (APN) identifying a server which will service a UE 100. The services include Simple Internet Protocol (IP), Layer Two Tunneling Protocol (L2TP), and Dynamic Host Configuration Protocol (DHCP) Relay. For the UE 100 to receive most of the services except the Simple IP service, GTP-U tunnels are first created between the RNC 105 and the SGSN 110 and between the SGSN 110 and the GGSN 120 and a PDP address is allocated to the UE 100 by additional signaling.

In the above conventional charging method, a Charging Gateway (CG) receives charging information separately from the SGSN 110 and the GGSN 120, and selects the charging information containing the smaller traffic amount as the final charging information for the user. The traffic amount included in the charging information collected by the SGSN and the GGSN also includes the amount of traffic caused by the additional signaling.

The inclusion of the additional signaling traffic in the charging information results in overcharging mobile users. Accordingly, a need exists for a method of synchronizing the start time of charging for actual user traffic between the SGSN and the GGSN.

In synchronizing the charging start, excluding signaling traffic accompanying a service in the GGSN leads to an overcharge calculated by the SGSN compared to the charge calculated by the GGSN. Therefore, the charging information of the SGSN is not adopted.

If the GGSN includes the signaling traffic in charging for the service, this results in a charge on the mobile user for signaling.

SUMMARY OF THE INVENTION

An object of the present invention is to substantially solve at least the above problems and/or disadvantages and to provide at least the advantages below. Accordingly, an object of the present invention is to provide a charging system and method in which the amount of additional signaling traffic generated for a service that a user equipment (UE) receives from an external network is excluded in charging the user of the UE for the service and a Serving GPRS Support Node (SGSN) and a Gateway GPRS Support Node (GGSN) charge the user for the service at an actual start of the service.

Another object of the present invention is to provide a system and method of synchronizing a reference time point for charging between a SGSN and a GGSN.

The above objects are achieved by providing a system and method of charging for user traffic except signaling in a wireless communication system.

According to one aspect of the present invention, in a system and method of charging a UE in a gateway node in a mobile communication system having a serving support node within a radio network connected to the UE and the gateway node for connecting the radio network to a home server in an external network, the gateway node acquires from the external network the address of a home server that provides a service requested by the UE, stores the home server address, clears charging information collected with respect to signaling generated until prior to the allocation of the home server address, and re-collects charging information about the service that the UE receives.

BRIEF DESCRIPTION OF THE DRAWINGS

The above and other objects, features and advantages of the present invention will become more apparent from the following detailed description when taken in conjunction with the accompanying drawings in which.

Throughout the drawings, the same element is designated by the same reference numeral or character.

DETAILED DESCRIPTION OF EXEMPLARY EMBODIMENTS

Embodiments of the present invention will be described herein below with reference to the accompanying drawings. In the following description, well-known functions or constructions are not described in detail for conciseness.

In accordance with an embodiment of the present invention, a Gateway GPRS Support Node (GGSN), which is involved in signaling for user equipment (UE)-requested services such as Point to Point Protocol (PPP), Mobile Internet Protocol (IP) (hereinafter "MIP"), and Dynamic Host Configuration Protocol (DHCP) Relay, determines the actual action time of a service and notifies a Serving GPRS Support Node (SGSN) of the initiation of the service. Then the GGSN and the SGSN clear up charging information inconsistencies after the initiation of service and then collect charging information except signaling information regarding the service.

Figure 1:
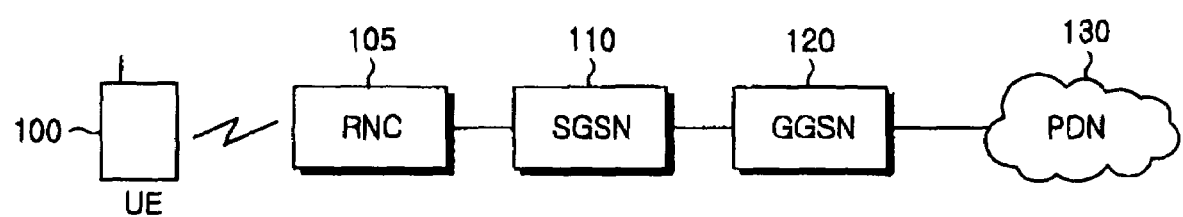
FIG. 1 is a block diagram illustrating the configuration of a conventional Universal Mobile Telecommunication System (UMTS) system.
Figure 2:
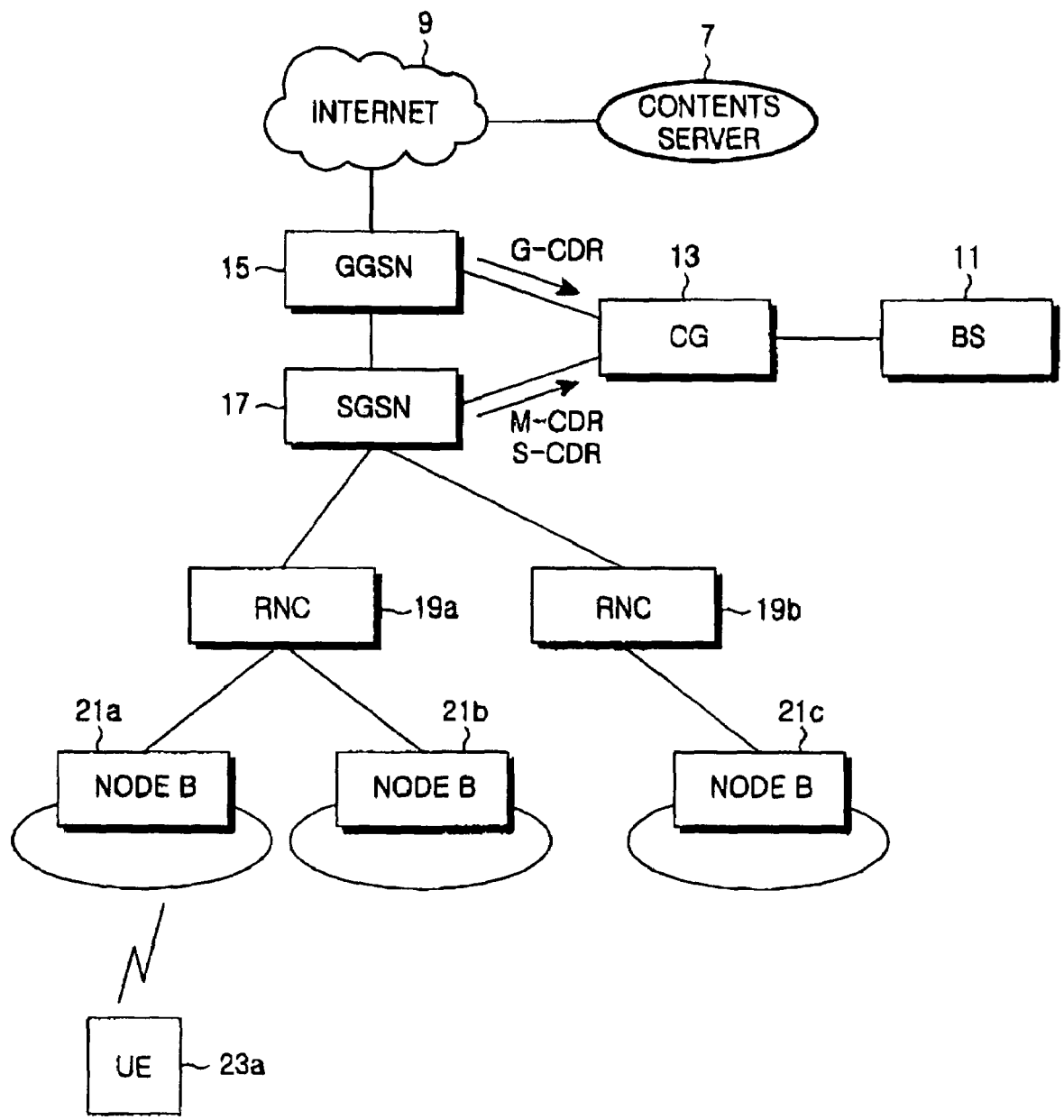
FIG. 2 illustrates an exemplary configuration of the conventional UMTS system.

FIG. 2 illustrates an exemplary configuration of a conventional Universal Mobile Telecommunication System (UMTS) system. Referring to FIG. 2, the UMTS system includes Node Bs 21a, 21b and 21c, RNCs 19a and 19b, a GGSN 15, a SGSN 17, a Charging Gateway (CG) 13, and a Billing System (BS) 11. The Node Bs 21a and 21b communicate with a UE 23a through a Mobile Switching Center (MSC) (not shown). The RNCs 19a and 19b manage radio resources, operate and maintenance the Node Bs, and provide connectivity to a Core Network (CN). The GGSN 15 connects a General packet Radio Services (GPRS) network to an external network such as an Internet 9. The SGSN 17 tracks the location of the UE 23a and transmits packets to the UE 23a within a service area. The CG 13 determines loss and redundancy by processing GPRS Tunneling Protocol Prime (GTP') data transmitted by the SGSN 17 and the GGSN 15 and transmits the GTP' data to the BS 11. The BS 11 calculates the charge of a service based on charging information received from every node.

The SGSN 17 manages packet-mode data service for the UE 23a by establishing a mobility management context for the packet mode of the UE 23a. The functions of the SGSN 17 includes packet routing and transfer, mobility management (such as attach, detach, and location management), logical link management, authentication and charging. The GPRS network introduced a new tunneling protocol, GPRS Tunneling Protocol (GTP) between the SGSN and the GGSN to support the mobility management, registration and authentication of UEs. The SGSN 17 and the GGSN 15 establish a Packet Data Protocol (PDP) context and transfer Service Data Units (SDUs) by GTP tunneling.

The GGSN 15 is a GPRS gateway node directly connected to the Internet 9, located between the GPRS backbone network and the Internet 9. In the UMTS system, the GGSN 15 maintains routing information that is necessary to tunnel SDUS to the SGSN 17 that supports packet-mode data service for the UE 23a, for tunneling and IP routing.

To transfer a packet received from an external PDN to a MT, the SGSN that manages the UE must be determined. Therefore, the database (such as a PDP context) preserved in the GGSN stores information about the UE's SGSN along with a user profile. The PDP context contains all information associated with a service for the UE, such as the address (PDP address) of a home server and charging information.

The SGSN 17 and the GGSN 15 transmit charging information associated with the service for the UE 23a to the BS 11 via the CG 13.

A description will now be made of service charging by the SGSN and GGSN in the case where a UE receives a mobile IP service, for example.

Figure 3:
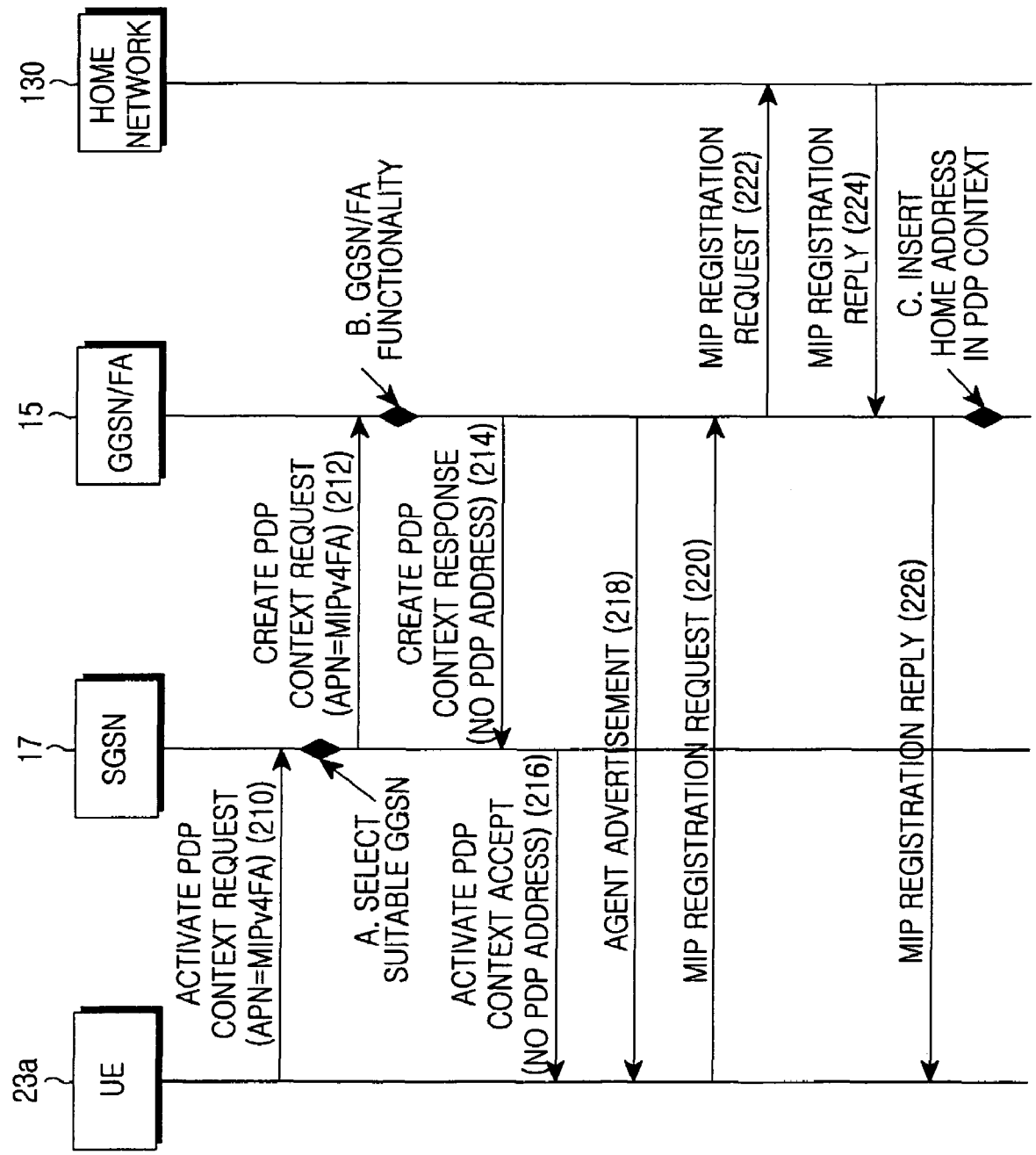
FIG. 3 is a diagram illustrating a signal flow for allocating a mobile Internet Protocol (IP) address according to an embodiment of the present invention.

Before the description of the charging method, a signal flow for the mobile IP service will be depicted with reference to FIG. 3.

FIG. 3 is a diagram illustrating a signal flow for allocating a Mobile IP address to the UE 23a. Referring to FIG. 3, the UE 23a transmits to the SGSN 17 an Activate PDP Context Request (APCQ) message for connection to an external server in step 210. The APCQ message includes Protocol Configuration Option (PCO) for providing protocol information, and Access Point Name (APN) identifying a Mobile IP service request. The APN, for example, indicates Mobile IPv4.

In step 212, the SGSN 17 establishes a GTP tunnel with the GGSN 15 identified by the APN among a plurality of GGSNs in relation to the PDP context request and transmits to the GGSN 15 a Create PDP Context Request (CPCQ) message comprising the APN.

The GGSN 15 allocates an ID according to the APN and transmits it to the SGSN 17 a Create PDP Context Response (CPCR) message in step 214. The IP address of a home server (PDP address) which will serve the UE 23a is not known to the GGSN 15 yet.

In step 216, the SGSN 17 transmits an Activate PDP Context Accept (APCA) message to the UE 23a. Through steps 210 to 216, a GTP tunnel path is established by the PDP activation to support the service between the UE 23a and the GGSN 15. Since the GGSN 15 has no knowledge of the PDP address, it assumes that the UE-requested service has not started yet.

In step 218, the GGSN 15 transmits an Agent Advertisement message to the UE 23a through the established GTP tunnel path. The UE 23a starts a registration request procedure for the Mobile IP service by transmitting an MIP Registration Request message to the GGSN 15 via the SGSN 17 in step 220. In step 222, the GGSN 15 forwards the MIP Registration Request message to a Home Network (HN) 130. The HN 130 transmits to the GGSN 15 an MIP Registration Reply message contain the PDP address, that is, the address of the home server that will service the UE 23a in step 224. The GGSN 15 then stores the PDP address in its PDP context. The UE 23a receives a MIP Registration Reply message from the GGSN 15 via the SGSN 17 in step 226. Thus the Mobile IP service is provided to the UE 23a.

At the time the PDP address is allocated to the UE 23a, the Mobile IP Service actually starts. Therefore, the GGSN 15 and the SGSN 17 clear charging information collected up to that time with respect to signaling at the PDP address allocation time and then start to collect charging information.

To serve the above purpose, the GGSN 15 and the SGSN 17 synchronize their reference times of charging by exchanging updated PDP context messages according to an embodiment of the present invention.

Figure 4:
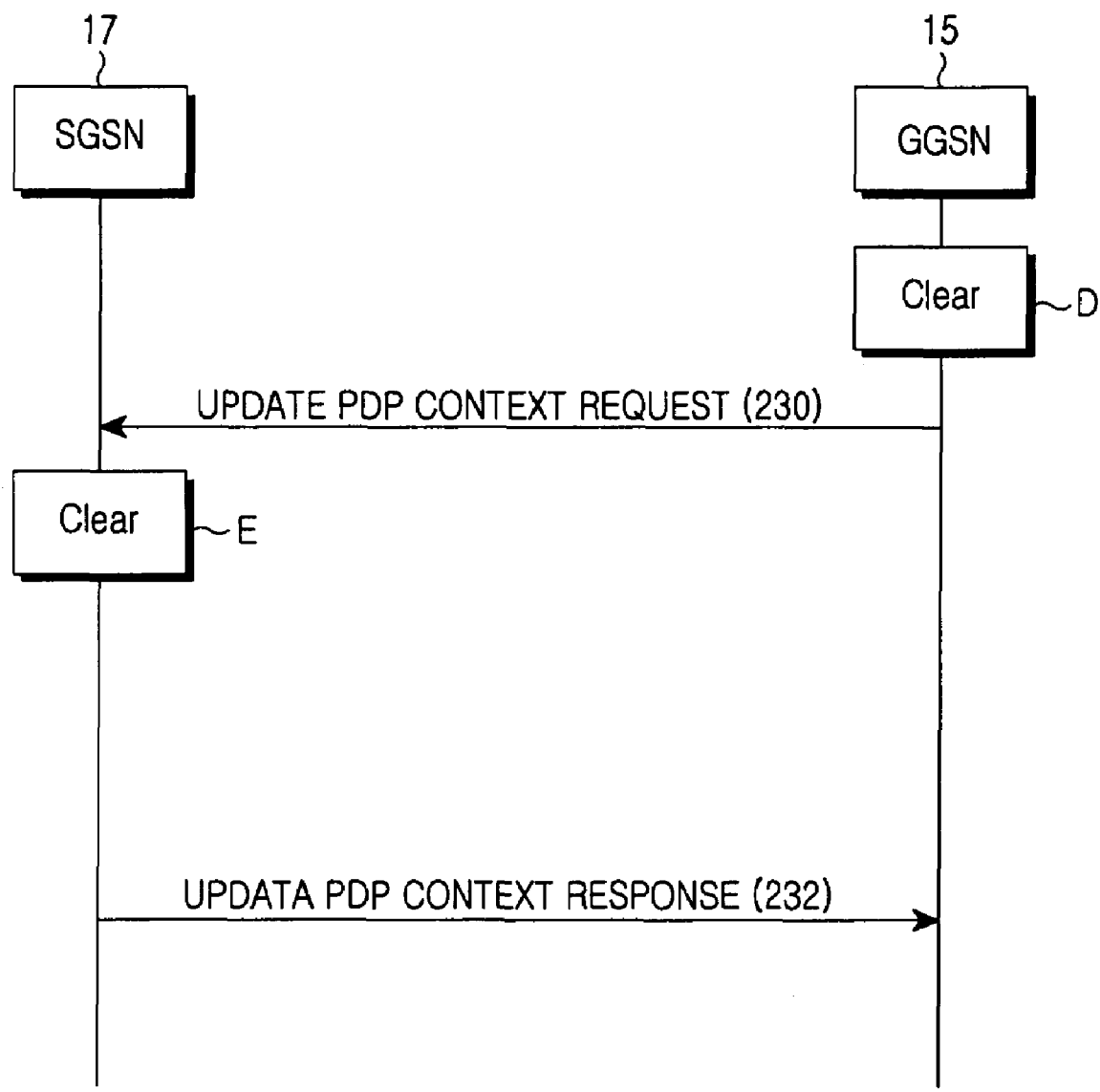
FIG. 4 is a diagram illustrating transmission of an Update Packet Data Protocol (PDP) Context Request message from a Gateway GPRS Support Node (GGSN) to a Serving GPRS Support Node (SGSN) according to an embodiment of the present invention.

With reference to FIG. 4, synchronization of a charging reference time by PDP context messages will be described.

FIG. 4 illustrates transmission of an Update PDP Context Request message from the GGSN to the SGSN.

Referring to FIG. 4, the GGSN 15 transmits to the SGSN 17 an Update PDP Context Request (UPCR) message containing an End User Address (EUA) with the allocated PDP address in step 230.

The SGSN 17 clears charging information about the UE in its PDP context when the EUA contains the PDP address, as indicated reference numeral E. Then the SGSN 17 starts to re-collect charging information, monitoring traffic for the UE. The charging information includes call duration, uplink data amount, downlink data amount, and QoS information.

In step 232, the SGSN 17 transmits an Update PDP Context Response (UPCR) message to the GGSN 15.

As described above, the SGSN and the GGSN set the reference start time of charging as the PDP address allocation time by exchanging the update PDP context messages, and clear their charging information collected prior to the PDP address allocation. The SGSN and the GGSN then re-collect charging information, monitoring a traffic flow of the service for the user, and transmit the charging information to the BS.

Meanwhile, if the UE requests an L2TP service with Virtual Private Network (VPN) connections, the GGSN participates only in establishing an L2TP tunnel between it and a L2TP Network Server (LNS), not in a PPP connection between the UE and the LNS. Since as a result, the GGSN does not know a PDP address unlike in other services, the GGSN determines the time of allocating the PDP address from an PPP IP Control Protocol (IPCP) message between the UE and the LNS.

For the VPN server, the UE must establish a PPP tunnel with the LNS that provides the VPN service. To that end, a PDP context is activated between the UE and the GGSN. Also, an L2TP tunnel is activated between the GGSN and a VPN server. That is, packet data transmitted to the VPN server is transferred to the UE via the LNS, the GGSN and the SGSN.

That is, the VPN service requires tunnels and sessions for GTP tunneling between the SGSN and the GGSN and for L2TP tunneling between the GGSN and the LNS. The tunnels and sessions are separated into the FTP tunnel between the SGSN and the GGSN and the L2TP tunnel between the GGSN and the LNS.

Upon request for the VPN service from the UE, the SGSN forms the GTP tunnel and a session of protocol stacks is established between the SGSN and the GGSN.

After formation of the GTP tunnel, the GGSN, upon receipt of a Line Control Protocol (LCP) message from the SGSN, generates the L2TP tunnel with the LNS. The GGSN and the LNS establish the session of protocol stacks between them, thereby creating an L2TP connection.

The UE exchanges Challenge Handshake Authentication Protocol (CHAP) messages, Password Authentication Protocol (PAP) messages, and IPCP messages with the LNS through the L2TP tunnel. Thus, the UE can receive an IP from the VPN server and then the VPN service.

Figure 5:
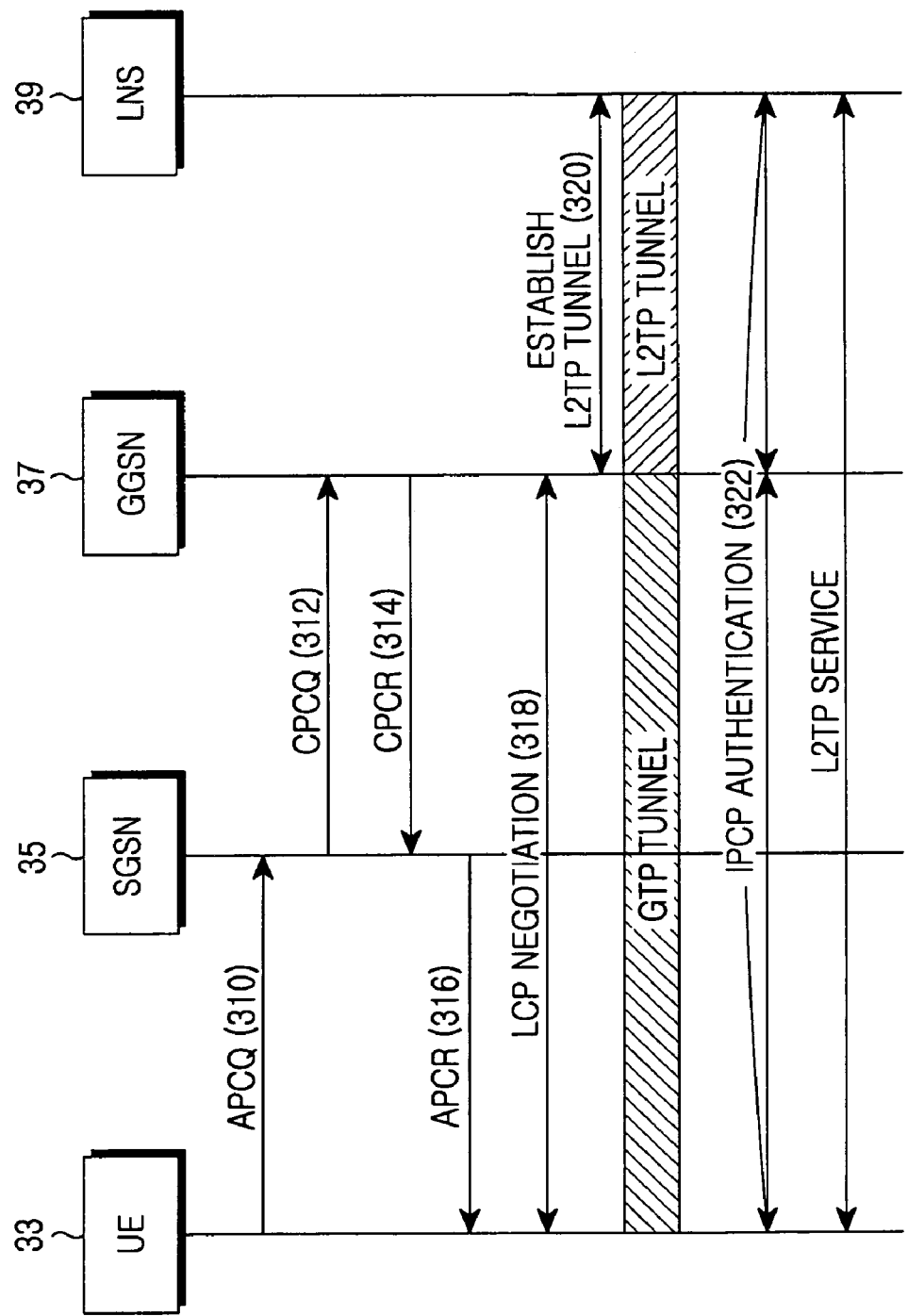
FIG. 5 is a diagram illustrating a signal flow for providing a Layer Two Tunneling Protocol (L2TP) service to a user equipment (UE) according to an embodiment of the present invention.

FIG. 5 is a diagram illustrating a signal flow for providing an L2TP service to a UE according to an embodiment of the present invention. Referring to FIG. 5, a UE 33 transmits an APCQ message to an SGSN 35, requesting the L2TP service in step 310.

In step 312, the SGSN 35 generates a tunnel ID (TID) identifying a GTP tunnel between the SGSN 35 and a GGSN 37 for the requested PDP connection. The SGSN 35 then attaches the TID to the header of packet data to be transmitted to the GGSN 37.

The GGSN 37 generates a CPCR message according to the TID and transmits it to the SGSN 35 in step 314.

The SGSN 35 transmits an APCR message to the UE 33 in step 316. In steps 310 to 316, a GTP tunnel path has been established between the UE 33 and the GGSN 37 to support the VPN service.

In step 318, the UE 300 makes Link Control Protocol (LCP) negotiations with the GGSN 37. The LCP negotiations involve negotiations of a maximum receive unit and authentication protocol for the UE 33 in relation to packet data transmission.

After the establishment of the GTP tunnel path between the UE 33 and the GGSN 37, a packet data path for the L2TP service is established between the GGSN 37 and the LNS 39. Thus, in step 320, the GGSN 37 establishes an L2TP tunnel with an LNS 39, for packet data transmission in the L2TP service.

In step 322, the LNS 39 exchange CHAP, PAP, and IPCP messages with the UE 33 through the GGSN 37. The IPCP message is transmitted based on an IP address allocated by the LNS 39 and includes a PDP address. The GGSN 120 extracts the PDP address from the IPCP message. At the time the PDP address is allocated, service charging starts.

That is, the UE 33 receives from the LNS 39 the PDP address of a home server which provides the L2TP service and connects to the home server. The L2TP service starts when the PDP address is received. Therefore, the GGSN 37 and the SGSN 35 clear charging information about signaling collected up to that time at the PDP allocation time and re-collects charging information, thereby avoiding overcharging.

To do so, the GGSN 37 transmits to the SGSN 35 a UPCR message containing the allocated PDP address. The SGSN 17 clears charging information about the UE 33 in its PDP context until the PDP address allocation and starts to re-collect charging information for the UE 33. The operation for determining out the reference charging time and then charging for the L2TP service is performed in the same manner as in the mobile IP service.

Figure 6:
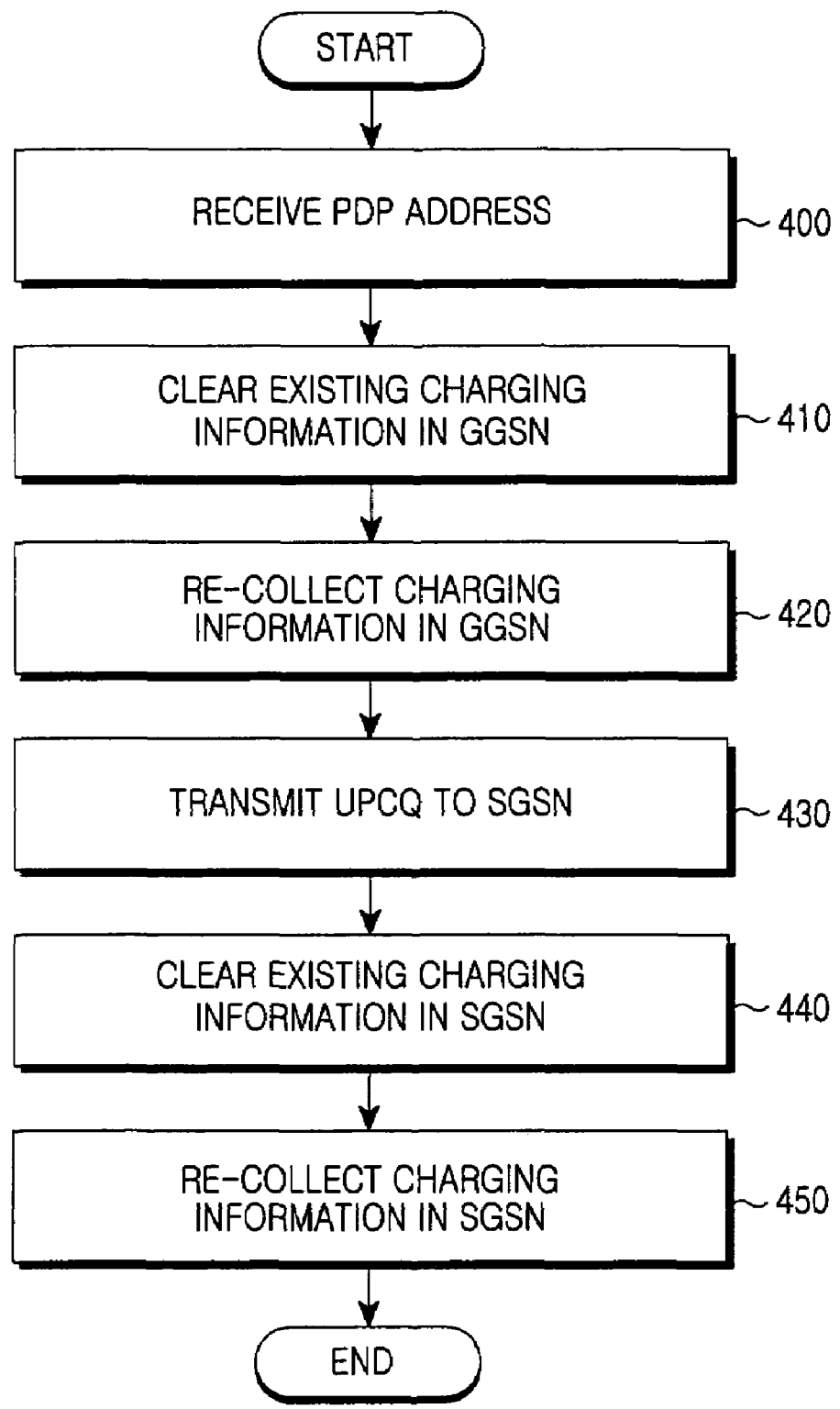
FIG. 6 is a flowchart illustrating a charging procedure in the GGSN and the SGSN according to an embodiment of the present invention.

FIG. 6 is a flowchart illustrating a charging procedure in the GGSN and the SGSN according to an embodiment of the present invention.

Referring to FIG. 6, the GGSN acquires the IP address of a home server that will service the UE, that is, a PDP address in step 400.

In step 410, the GGSN stores the PDP address in its PDP context and clears charging information collected for the UE prior to the PDP address allocation.

The GGSN re-collects charging information for monitoring a traffic flow for the UE in step 420 and transmits a UPCQ message including the PDP address to the SGSN in step 430.

In step 440, the SGSN stores the PDP address in its PDP context and clears charging information collected for the UE prior to the PDP address allocation. The SGSN re-collects charging information for monitoring the traffic flow for the UE in step 450.

In accordance with an embodiment of the present invention as described above, an SGSN and a GGSN charge a user for a service using a PDP address allocation time as a charging reference time. Therefore, additional signaling generated prior to the service actually starting is excluded from the service charge and the reference charging time is synchronized between the SGSN and the GGSN.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method of charging a user equipment (UE) in a gateway node in a mobile communication system, comprising the steps of:

providing a serving support node within a radio network connected to the UE and the gateway node for connecting the radio network to a home server in an external network;

acquiring from the external network the address of a home server that provides a service requested by the UE; and storing the home server address, clearing charging information collected with respect to signaling generated prior to the allocation of the home server address, and re-collecting charging information about the service that the UE receives.

2. The method of claim 1, further comprising the step of transmitting a message comprising the home server address to the serving support node to provide a reference time of collecting the charging information.

3. The method of claim 2, wherein the message is an update packet data protocol (PDP) context request message including an end user address (EUA) with the home server address.

4. The method of claim 1, wherein the acquiring step comprises the step of, when the UE requests a mobile internet protocol (IP) service, receiving a message including the home server address from the home server that provides the mobile IP service, after PDP activation with the UE.

5. The method of claim 4, wherein the message is a mobile IP registration response message.

6. The method of claim 1, wherein the acquiring step comprises the step of, when the UE requests a layer 2 tunneling protocol (L2TP) service, acquiring the home server address from an Internet protocol control protocol (IPCP) authentication message transmitted through the gateway node between the UE and the home server that provides the L2TP service, after PDP activation with the UE.

7. The method of claim 1, further comprising the step of transmitting the charging information re-collected by the gateway node to a billing server.

8. A method of charging a user equipment (UE) in a serving support node in a mobile communication system, comprising the steps of:

providing the serving support node within a radio network connected to the UE and a gateway node for connecting the radio network to a home server in an external network;

acquiring from the external network the address of a home server that provides a service requested by the UE; and storing the home server address, clearing charging information collected with respect to signaling generated prior to the allocation of the home server address, and re-collecting charging information about the service that the UE receives.

9. The method of claim 8, wherein the acquiring step comprises the step of receiving an update message from the gateway node and acquiring the home server address included in an end user address (EUA) of the message.

10. The method of claim 8, further comprising the step of transmitting the charging information re-collected by the serving support node to a billing server.

11. A system for accurately charging a user equipment (UE) in a mobile communication, comprising:

a Gateway GPRS Support Node (GGSN) for acquiring from an external network the address of a home server that provides a service requested by the UE; and a Serving GPRS Support Node (SGSN) for storing the home server address, clearing charging information collected with respect to signaling generated prior to the allocation of the home server address, and re-collecting charging information about the service that the UE receives.

12. The system of claim 11, wherein the GGSN receives an update message from the gateway node and acquires the home server address included in an end user address (EUA) of the message.

13. The system of claim 11, wherein the GGSN and the SGSN transmit the charging information re-collected by the serving support node to a billing server.

* * * * *